(12) United States Patent
Hirasawa

(10) Patent No.: US 9,785,036 B2
(45) Date of Patent: Oct. 10, 2017

(54) IMAGING SYSTEM, LIGHTING DEVICE, AND CONTROL METHOD

(71) Applicant: CANON KABUSHIKI KAISHA, Tokyo (JP)

(72) Inventor: Ginta Hirasawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 14/845,129

(22) Filed: Sep. 3, 2015

(65) Prior Publication Data
US 2016/0077406 A1    Mar. 17, 2016

(30) Foreign Application Priority Data

Sep. 12, 2014  (JP) ................................. 2014-186875

(51) Int. Cl.
| | | |
|---|---|---|
| G03B 15/05 | (2006.01) | |
| G01B 11/14 | (2006.01) | |
| G01S 17/42 | (2006.01) | |
| G01S 17/88 | (2006.01) | |

(52) U.S. Cl.
CPC ............. G03B 15/05 (2013.01); G01B 11/14 (2013.01); G01S 17/42 (2013.01); G01S 17/88 (2013.01); *G03B 2206/00* (2013.01); *G03B 2215/0528* (2013.01)

(58) Field of Classification Search
CPC ............... G03B 15/05; G03B 2206/00; G03B 2215/0528; G03B 7/16; G03B 15/06; G03B 2215/0521; G03B 2215/0585; G03B 15/03; G01B 11/14; G01S 17/42; G01S 17/88; H04N 5/2256; H04N 5/2354; F21V 14/02
See application file for complete search history.

(56) References Cited

U.S. PATENT DOCUMENTS

| | | | | |
|---|---|---|---|---|
| 4,512,644 A | * | 4/1985 | Yoshida ................. | G03B 15/05 396/174 |
| 5,093,681 A | * | 3/1992 | Matsuzaki .............. | G03B 7/16 396/163 |
| 8,736,710 B2 | * | 5/2014 | Spielberg .............. | G03B 15/05 348/222.1 |
| 2015/0037021 A1 | * | 2/2015 | Umehara ............. | H04N 5/2354 396/174 |
| 2015/0261068 A1 | * | 9/2015 | Ooyama ................ | G03B 15/05 348/371 |

FOREIGN PATENT DOCUMENTS

JP        2009-163179 A       7/2009

* cited by examiner

*Primary Examiner* — Bao Q Truong
(74) *Attorney, Agent, or Firm* — Canon U.S.A., Inc. IP Division

(57) ABSTRACT

An imaging system includes a flash device that can automatically drive a movable unit provided with a light emitting unit to change an irradiating direction of the light emitting unit, and an imaging device. The imaging system includes a first distance measuring unit that measures a distance to an object, a correcting unit that corrects first distance information obtained by the first distance measuring unit performing measurement, and a calculating unit that calculates the irradiating direction of the light emitting unit based on the corrected first distance information, wherein the correcting unit corrects the first distance information in a direction in which the irradiating direction calculated by the calculating unit separates away from the object.

14 Claims, 10 Drawing Sheets

FIG. 9

| IDEAL INCIDENT ANGLE θ2 | CORRECTED SUBJECT DISTANCE Xt | | |
|---|---|---|---|
| CORRECTED BOUNCE SURFACE DISTANCE Yt | 1m | 5m | 10m |
| 1m | θ | θ+5° | θ+15° |
| 3m | θ+5° | θ+10° | θ+20° |
| 5m | θ+10° | θ+15° | θ+25° |

IMAGING SYSTEM, LIGHTING DEVICE, AND CONTROL METHOD

BACKGROUND OF THE INVENTION

Field of the Invention

The present invention relates to control of a lighting device that can automatically change an irradiating direction.

Description of the Related Art

Conventionally, when a lighting device such as a strobe device (hereinafter, simply referred to as strobe) emits light and photographing is performed, the strobe is controlled to face a ceiling or a wall to emit light, and diffusing strobe light is performed. By the diffusion of light, more natural light distribution than direct irradiation of an object with the strobe light can be obtained. Such a technique of performing photographing by diffusing the strobe light is typically referred to as bounce photographing.

Japanese Patent Application Laid-Open No. 2009-163179 discusses a technology that acquires distances to a focused object and to a reflection surface, based on a lens position of a focus lens when a photographing lens is focused on the object to obtain a bounce angle at which bounce light illuminates the object, from the acquired distances.

However, in the technology described in Japanese Patent Application Laid-Open No. 2009-163179, an error is caused in acquiring a distance to the object and a distance to the reflection surface. Therefore, a bounce angle inappropriate for the bounce photographing may be obtained. For example, when depth of field is deep, a focusing range of an object distance relative to a position of the focus lens is several meters. That is, the distance to the focused object acquired based on the lens position of the focus lens includes an error of several meters. Therefore, when the acquired distance to the object and an actual distance to the object are different by several meters, the object may be unnaturally irradiated with the bounce light at the obtained bounce angle.

SUMMARY OF THE INVENTION

The present invention is directed to reducing unnatural irradiation of an object with bounce light even if an irradiating direction of a lighting device is automatically determined.

According to an aspect of the present invention, an imaging system includes a flash device that can automatically drive a movable unit comprising a light emitting unit to change an irradiating direction of the light emitting unit, and an imaging device. The imaging system includes a first distance measuring unit configured to measure a distance of an object, a correcting unit configured to correct first distance information obtained by the first distance measuring unit performing measurement, and a calculating unit configured to calculate the irradiating direction of the light emitting unit based on the corrected first distance information, wherein the correcting unit corrects the first distance information in a direction in which the irradiating direction calculated by the calculating unit separates away from the object.

Further features of the present invention will become apparent from the following description of exemplary embodiments with reference to the attached drawings.

BRIEF DESCRIPTION OF THE DRAWINGS

FIG. 9 is a diagram illustrating a relationship among an ideal incident angle $\theta 2$, an object distance, and a bounce distance.

DESCRIPTION OF THE EMBODIMENTS

Figure 1:
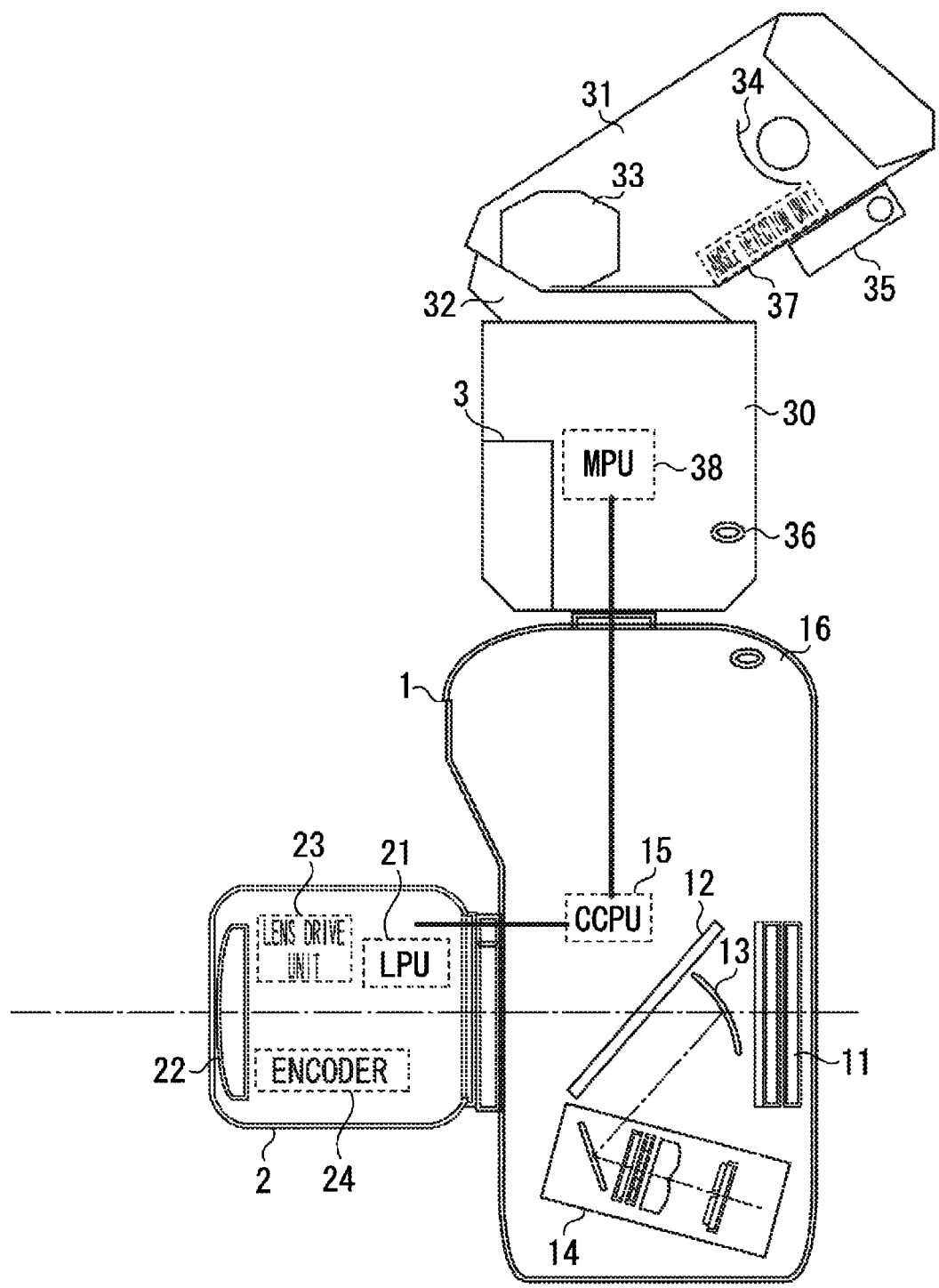
FIG. 1 is a diagram illustrating a cross section of an example of an imaging device according to an exemplary embodiment of the present invention.

Hereinafter, exemplary embodiments of the present invention will be described with reference to the drawings. FIG. 1 is a diagram illustrating a cross section of an example of an imaging device according to an exemplary embodiment of the present invention. The illustrated imaging device is a single-lens reflex type digital camera (hereinafter, simply referred to as camera) with an interchangeable photographing lens unit (hereinafter, simply referred to as lens unit). The illustrated camera includes a camera main body 1. A lens unit (also referred to as interchangeable lens) 2 is mounted on the camera main body 1. Further, a lighting device (also referred to as flash device or strobe) 3 is detachably mounted on the camera main body 1. As described above, in the present exemplary embodiment, an imaging system including the camera main body 1, the lens unit 2, and the flash device 3 will be described.

First, an internal configuration of the camera main body 1 will be described. A microcomputer central control processing unit (CCPU) (hereinafter, camera microcomputer) 15 controls each unit of the camera main body 1. The camera microcomputer 15 has a built-in one-chip integrated circuit (IC) circuit configuration that includes a central processing unit (CPU), a read-only memory (ROM), a random access memory (RAM), an input/output control circuit (I/O control circuit), a multiplexer, a timer circuit, an electrically erasable programmable read-only memory (EEPROM), and analog/digital (A/D) and digital/analog (D/A) converters. The camera microcomputer can control the imaging system with software, and determines various types of conditions.

In the camera main body 1, an imaging element 11 including an area storage type photoelectric conversion element such as a complementary metal-oxide-semiconductor (CMOS) or a charge-coupled device (CCD) is arranged on a photographing optical axis of the lens unit 2. The imaging element 11 generates an image signal according to an optical image incident on the lens unit 2.

A focus detection unit 14 is arranged in the camera main body 1, and reflected light that has transmitted a main mirror 12 and reflected on a first reflection mirror 13 is input to the focus detection unit 14. The focus detection unit 14 performs focus detection in an arbitrary position on a photographing screen by an image shifting method.

A shutter switch 16 is provided on an upper surface of the camera main body 1. An operation to lightly press the shutter switch 16 (that is, half-pressing operation) is referred to as a shutter S1, and when the shutter S1 is executed (the shutter S1 is turned ON), the camera microcomputer 15 starts photometry and the focus detection of an object. An operation to deeply press the shutter switch 16 (that is, full pressing operation) is referred to as a shutter S2, and when the shutter S2 is executed (the shutter S2 is turned ON), the camera microcomputer 15 starts exposure.

Next, an internal configuration and an operation of the lens unit 2 will be described. A microcomputer local processing unit (LPU) (hereinafter, lens microcomputer) 21 controls each unit of the lens unit 2. The lens microcomputer 21 has a built-in one-chip IC circuit configuration that includes a CPU, a ROM, a RAM, an input/output control circuit (I/O control circuit), a multiplexer, a timer circuit, an EEPROM, and A/D and D/A converters.

A lens group 22 includes a plurality of lenses including a focus lens, and a zoom lens. The zoom lens may not be included in the lens group 22. A lens drive unit 23 is a drive system that moves the lenses included in the lens group 22. A drive amount of the lens group 22 is calculated in the camera microcomputer 15, based on an output of the focus detection unit 14 in the camera main body 1. The calculated drive amount is transmitted from the camera microcomputer 15 to the lens microcomputer 21. An encoder 24 is an encoder that detects the position of the lens group 22 and outputs drive information. The lens drive unit 23 moves the lens group 22 by the drive amount based on the drive information from the encoder 24 to perform focus adjustment.

Next, a configuration of the flash device 3 will be described.

The flash device 3 includes a flash main body unit (hereinafter, simply referred to as main body unit) 30 that controls the entire flash device 3, and a movable unit 31. A micro processing unit (MPU) 38 functioning as a flash control unit is included in the main body unit 30.

The main body unit 30 and the movable unit 31 are connected by a connecting portion 32, and the movable unit 31 can be turned in an up and down direction and a right and left direction in a state where the main body unit 30 is fixed to the camera main body 1. When the movable unit 31 is turned in the up and down direction and the right and left direction to the main body unit 30, an irradiating direction of a light emitting unit 34 can be changed without changing an orientation of the camera main body 1. Here, the right and left direction and the up and down direction are defined by setting the main body unit 30 where the connecting portion 32 is arranged, as an upper side.

The movable unit 31 includes a drive unit 33 including a motor, the light emitting unit 34 having a xenon tube or a light emitting diode (LED) as a light source, a ranging sensor 35, and an angle detection unit 37 including an encoder. The drive unit 33 drives the movable unit 31 to automatically change the irradiating direction of the light emitting unit 34 under control of the MPU 38 (hereinafter, strobe microcomputer).

As illustrated in the drawing, an auto bounce switch 36 is arranged on a side surface of the main body unit 30. The auto bounce switch 36 is used to select whether processing for automatically determining the irradiating direction of the light emitting unit 34 is performed in photographing.

A case in which the auto bounce switch 36 is turned ON, and the irradiating direction of the light emitting unit 34 is automatically determined will be described below.

As a ranging technique used in obtaining the above-described positional relationship, a so-called pulse propagation technique is used. In the pulse propagation technique, a time difference between light emission and light receiving is converted into a distance. That is, in this case, a distance to an object is measured according to a time difference from when the light irradiated from the light emitting unit 34 is reflected at the object, to when the reflected light is received by the ranging sensor 35.

For example, when the light is emitted from the flash device 3 toward the object, a distance between the object and the flash device 3 can be measured. On the other hand, when the light is emitted toward an object (also referred to as bounce surface) such as a wall other than the object, a distance between the object and the flash device 3 can be measured. In the present case, the distance to the object is measured by the pulse propagation technique. However, the distance to the object may be measured by another technique.

However, in the ranging method using the ranging sensor 35, the movable unit 31 needs to turn a direction of a desired distance toward the object to be measured. Therefore, in order to measure the distances to the object and to the bounce surface, respectively, it takes additional time in driving the movable unit 31.

As a technique of shortening the time required to measure the distances, there is a method for obtaining the distance to the object by using information about an object distance of the lens unit 2. If there are drive information output from the encoder and focus distance information of the lens unit 2 after performing the focus adjustment, the object distance of an object objected to the focus adjustment can be obtained. Therefore, information about the object distance such as the drive information output from the encoder and the focus distance information is transmitted from the lens microcomputer 21 to the strobe microcomputer 38 through the camera microcomputer 15, so that the time to measure the distance to the object can be shortened.

Although measurement accuracy is different depending on a type of the ranging methods, a measurement error is always caused in measurement of a distance. An influence of the measurement error on the irradiating direction control and an image will be described below. In the five examples to be described with reference to FIGS. 2 to 6 below, an influence on the irradiating direction control and on an image in a case where correction of a measured distance is not performed, will be described.

First, a case of performing ideal irradiating direction control without a measurement error of distance will be described with reference to FIG. 2.

Figure 2:
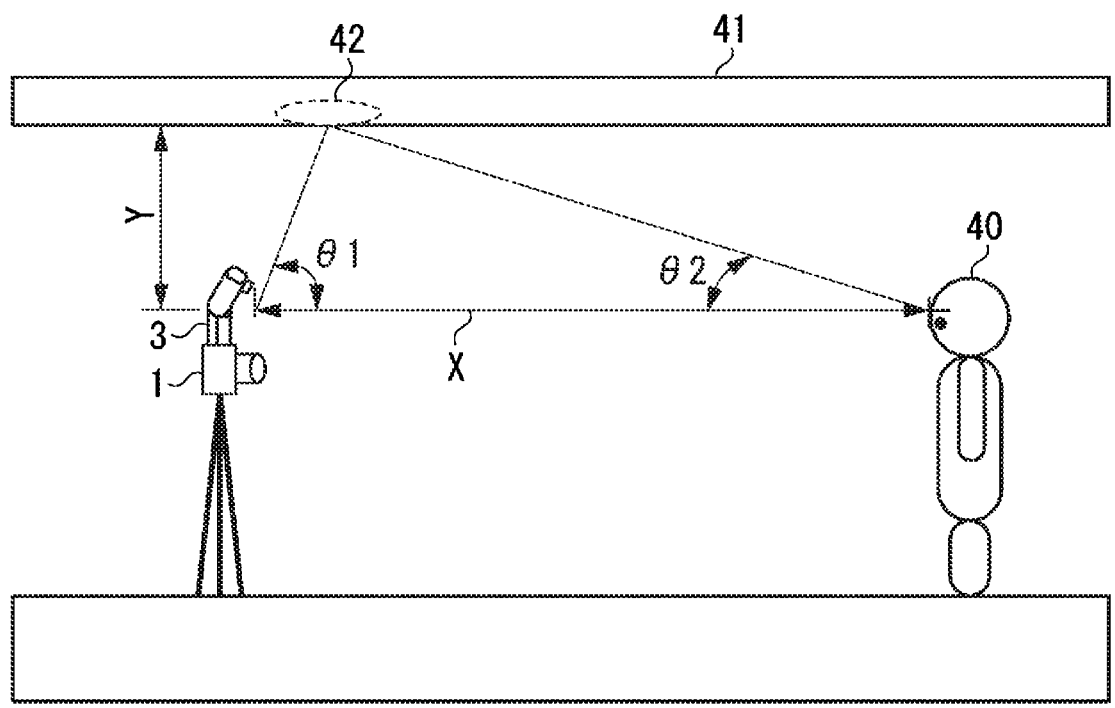
FIG. 2 is a diagram for describing ideal irradiating direction control.

A distance between the flash device 3 and an object 40 is an object distance X, and a distance between the flash device 3 and a bounce surface 41 is a bounce surface distance Y, in FIG. 2. An incident angle θ2 is an angle of reflected light at which ideal light distribution for the object 40 can be obtained, and is expressed by an inclination angle of the camera main body 1 with respect to a photographing optical axis. The incident angle θ2 is an angle at which natural light distribution can be obtained on the entire object 40, there is less reflected shadow, and a light emission amount of the flash device 3 can be minimized, and will be treated hereinafter as an ideal incident angle. Further, when the reflected light from a bounce surface shows the ideal incident angle, the bounce surface is treated as an ideal bounce surface 42.

An angle θ1 is a rotation angle of the movable unit 31 corresponding to the irradiating direction of the light emitting unit 34, and is expressed by an inclination angle of the camera main body 1 with respect to the photographing optical axis. The angle θ1 is calculated from the object distance X and the bounce surface distance Y as described below, and is calculated so that the reflected light from the bounce surface becomes the ideal incident angle if there is no measurement error in the object distance X and the bounce surface distance Y. That is, the irradiating direction of the light emitting unit 34 faces the ideal bounce surface 42 if there is no measurement error in the object distance X and the bounce surface distance Y.

As described above, the incident angle of the reflected light from the bounce surface toward the object becomes the ideal incident angle if there is no measurement error in the object distance X and the bounce surface distance Y, and more natural light distribution and a fine image can be obtained.

Figure 3:
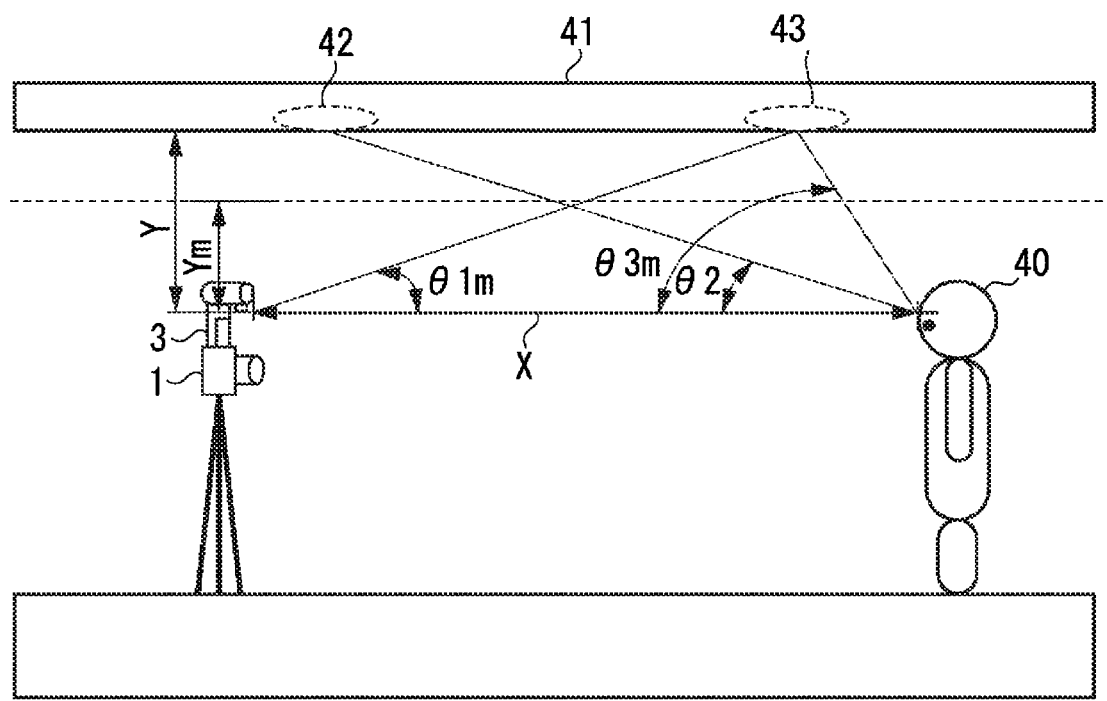
FIG. 3 is a diagram for describing irradiating direction control when a measured and acquired bounce surface distance is shorter than an actual distance.

Next, a case in which a measured and acquired bounce surface distance is shorter than an actual distance will be described with reference to FIG. 3.

Assume that a bounce surface distance Ym, which is shorter than the bounce surface distance Y, is acquired by measurement while an actual bounce surface distance is the bounce surface distance Y. The rotation angle calculated so that the incident angle of the reflected light from the bounce surface toward the object 40 becomes the ideal incident angle is an angle θ1m, on the premise that the bounce surface distance Ym is the actual bounce surface distance.

However, the bounce surface distance Ym is shorter than the actual bounce surface distance Y, and thus the bounce surface irradiated by the light emitting unit 34 becomes a bounce surface 43. At this time, the angle θ1m becomes narrower than the angle θ1. As illustrated in FIG. 3, the bounce surface 43 is closer to the object than the ideal bounce surface 42, and the incident angle of the reflected light from the bounce surface 43 toward the object 40 becomes an incident angle θ3m and the inclination to the object 40 is steeper than the incident angle θ2 as the ideal incident angle. In this case, there is a high possibility that the eyes and the nose of the object 40 are strongly shaded, and the image becomes unnatural (the object is unnaturally irradiated with the bounce light).

Figure 4:
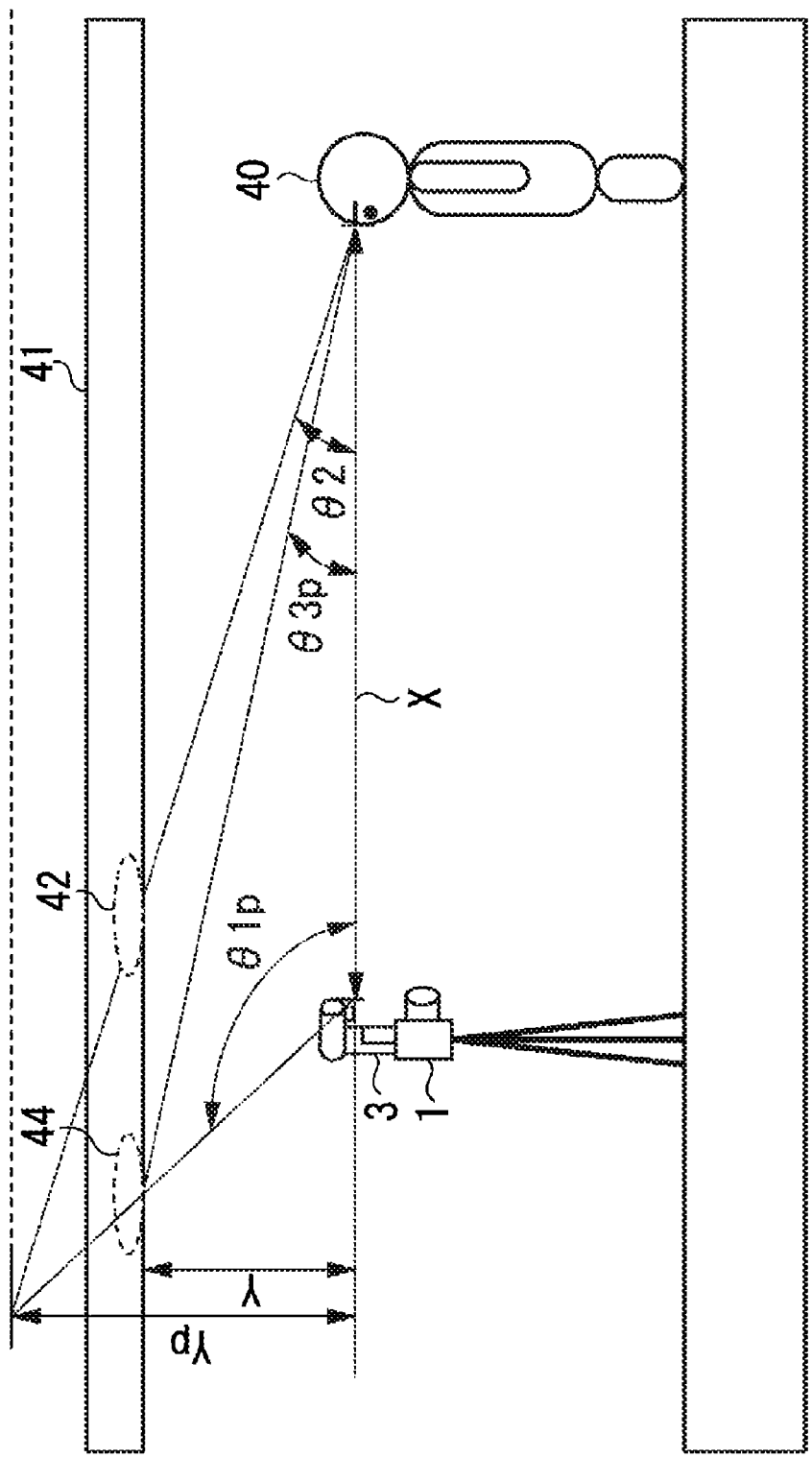
FIG. 4 is a diagram for describing irradiating direction control when a measured and acquired bounce surface distance is longer than an actual distance.

Next, a case in which a measured and acquired bounce surface distance is longer than an actual distance will be described with reference to FIG. 4.

Assume that a bounce surface distance Yp, which is longer than the bounce surface distance Y, is acquired by measurement, while an actual bounce surface distance is the bounce surface distance Y. The rotation angle calculated so that the incident angle of the reflected light from the bounce surface toward the object 40 becomes the ideal incident angle is an angle θ1p, on the premise that the bounce surface distance Yp is the actual bounce surface distance.

However, the bounce surface distance Yp is longer than the actual bounce surface distance Y, and thus the bounce surface irradiated by the light emitting unit 34 becomes a bounce surface 44. At this time, the angle θ1p is broader than the angle θ1. As illustrated in FIG. 4, the bounce surface 44 is more distant from the object than the ideal bounce surface 42, and the incident angle of the reflected light from the bounce surface 44 toward the object 40 becomes an incident angle θ3p and the inclination to the object 40 is gentler than the incident angle θ2 as the ideal incident angle. In this case, the bounce surface 44 is separated from the object, and a large light emission amount of the flash device 3 is required and thus an energy loss becomes large. However, in terms of the light distribution, the object is uniformly irradiated with the reflected light and natural light distribution and a fine image can be obtained.

Figure 5:
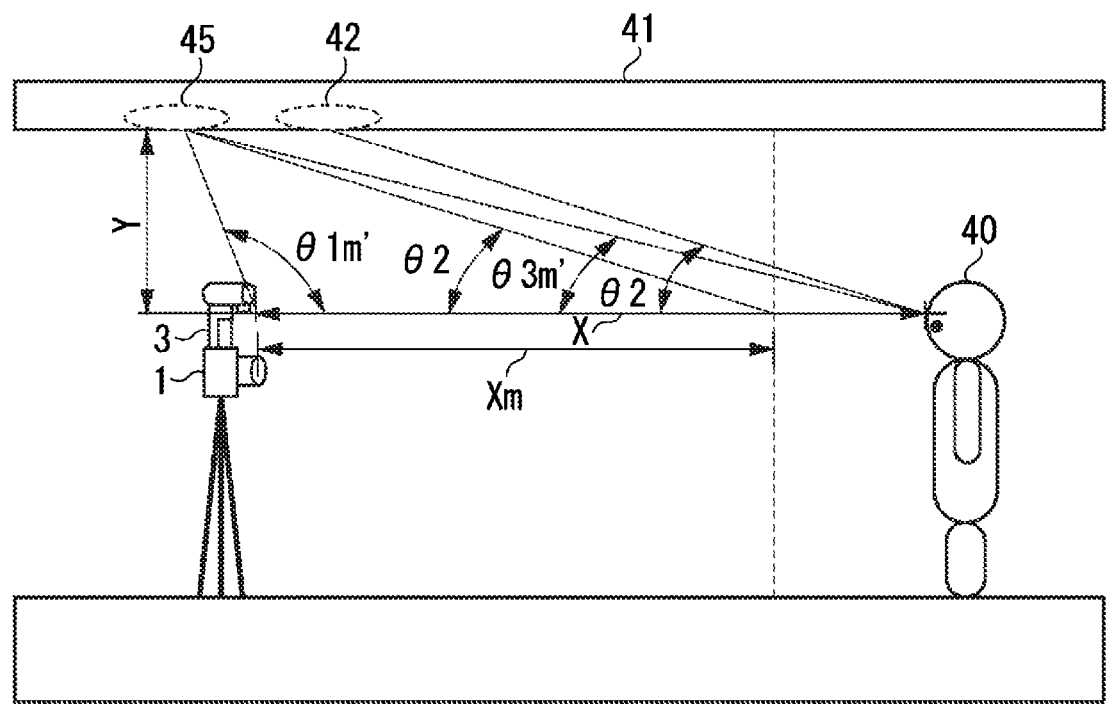
FIG. 5 is a diagram for describing irradiating direction control when a measured and acquired object distance is shorter than an actual distance.

Next, a case in which a measured and acquired object distance is shorter than an actual distance will be described with reference to FIG. 5.

Assume that an object distance Xm, which is shorter than the object distance X, is obtained by measurement, while an actual object distance is the object distance X. The rotation angle calculated so that the incident angle of the reflected light from the bounce surface toward the object 40 becomes the ideal incident angle is an angle θ1m', on the premise that the object distance Xm is the actual object distance.

However, the object distance Xm is shorter than the actual object distance X, and thus the bounce surface irradiated by the light emitting unit 34 becomes a bounce surface 45. At this time, the angle θ1m' is broader than the angle θ1. As illustrated in FIG. 5, the bounce surface 45 is more distant from the object than the ideal bounce surface 42, and the incident angle of the reflected light from the bounce surface 45 toward the object 40 becomes an incident angle θ3m' and the inclination to the object 40 is gentler than the incident angle θ2 that is the ideal incident angle.

In this case, the bounce surface 45 is separated from the object, and thus a large light emission amount of the flash device 3 is required and an energy loss becomes large. However, in terms of the light distribution, the object is uniformly irradiated with the reflected light and natural light distribution can be obtained, so that a fine image can be obtained.

Figure 6:
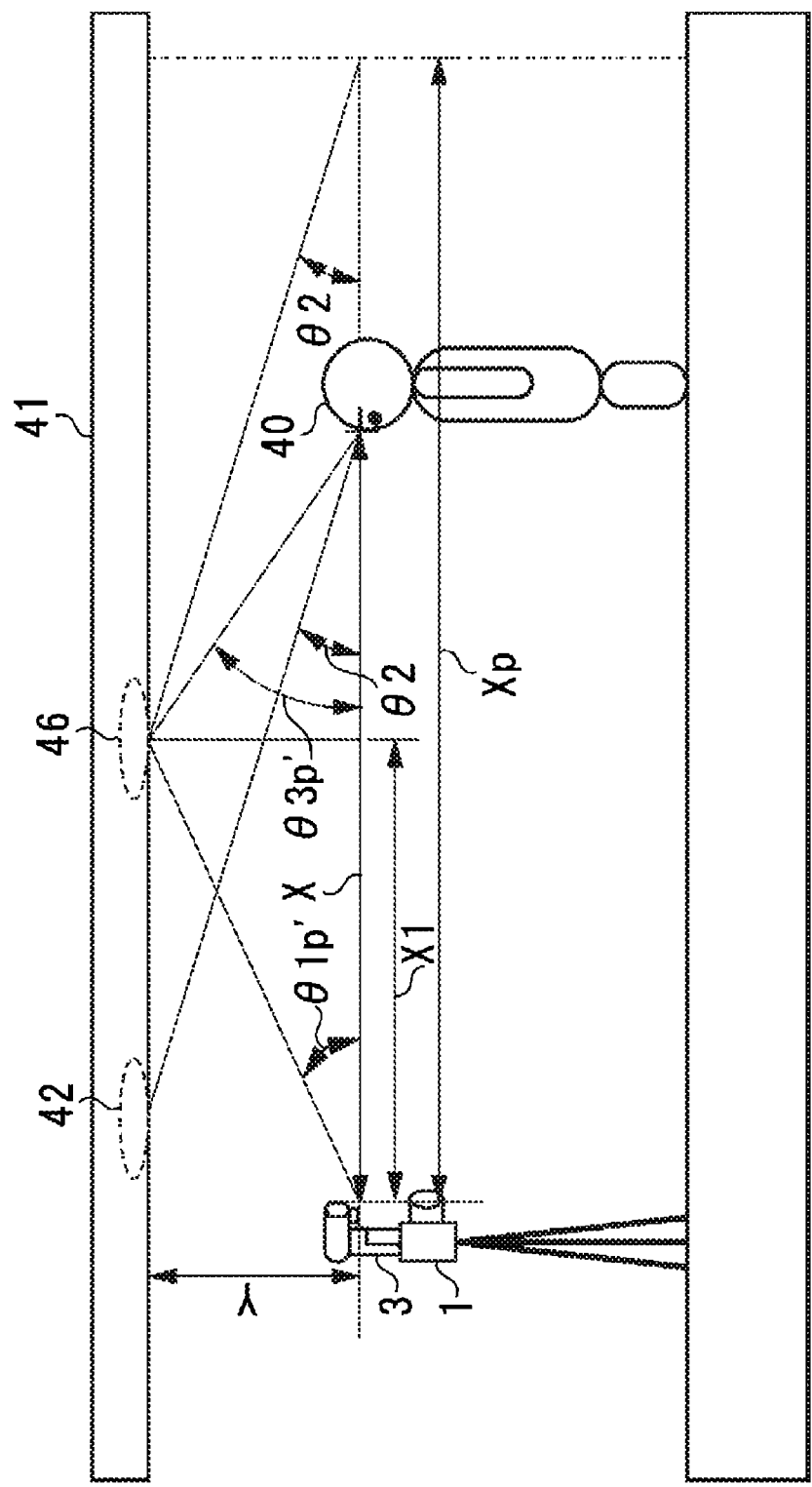
FIG. 6 is a diagram for describing irradiating direction control when a measured and acquired object distance is longer than an actual distance.

Finally, a case in which a measured and acquired object distance is longer than an actual distance will be described with reference to FIG. 6.

Assume that an object distance Xp, which is longer than the object distance X, is obtained by measurement, while an actual object distance is the object distance X. The rotation angle calculated so that the incident angle of the reflected light from the bounce surface toward the object 40 becomes the ideal incident angle, is an angle θ1p', on the premise that the object distance Xp is the actual object distance.

However, the object distance Xp is longer than the actual object distance X, and thus the bounce surface irradiated by the light emitting unit 34 becomes a bounce surface 46. At this time, the angle θ1p' is narrower than the angle θ1. As illustrated in FIG. 6, the bounce surface 46 is closer to the object than the ideal bounce surface 42, and the incident angle of the reflected light from the bounce surface 46 toward the object 40 becomes an incident angle θ3p' and the inclination to the object 40 is steeper than the incident angle θ2 that is the ideal incident angle.

In this case, there is a high possibility that the eyes and the nose of the object 40 are strongly shaded, and the image becomes unnatural (the object is unnaturally irradiated with the bounce light).

As illustrated in FIGS. 3 to 6, there is a high possibility that the object is unnaturally irradiated with the bounce light and an unnatural image is obtained when the bounce surface distance includes an error in a short direction (− direction), and the object distance includes an error in a long direction (+ direction). On the other hand, the irradiation does not become unnatural in terms of the light distribution although the light emission amount becomes large and the energy loss is increased when the bounce surface distance includes an error in the long direction (+ direction), and the object distance includes an error in the short direction (− direction). According to these results, by grasping a value of a ranging error caused in the ranging method in advance, and correcting the ranging error to take a favorable direction in terms of the light distribution with respect to the distance information used at the time of determination of the irradiating direction, unnatural light distribution can be reduced.

As described above, the favorable correction direction of the ranging error in terms of the light distribution is the direction of the long bounce surface distance (+ direction), and the direction of the short object distance (− direction). By performing correction in that way, the rotation angle of the movable unit 31 becomes a wider angle (faces a direction away from the object) than the case where the distance information is not corrected. Meanwhile, the incident angle of the reflected light as viewed from the object becomes narrower than the case where the distance information is not corrected.

Figure 7:
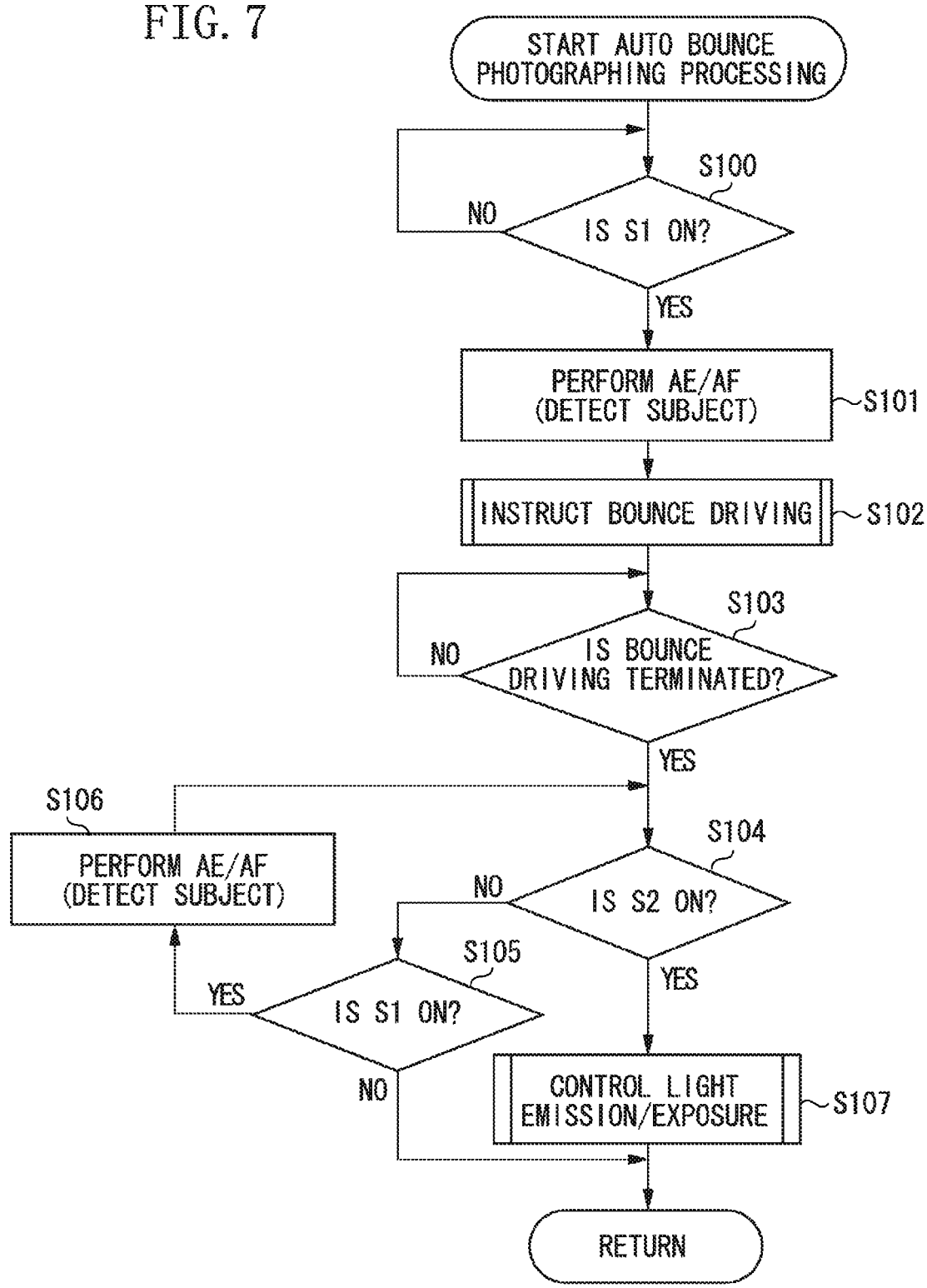
FIG. 7 is a flowchart for describing auto bounce photographing processing performed in a camera illustrated in FIG. 1.

FIG. 7 is a flowchart for describing auto bounce photographing processing performed in the camera illustrated in FIG. 1. The processing according to the illustrated flowchart is performed under control of the camera microcomputer 15. The processing according to the illustrated flowchart is performed when the auto bounce switch 36 is ON.

First, in step S100, the camera microcomputer 15 determines whether the shutter S1 is ON. When the shutter S1 is OFF (NO in step S100), the camera microcomputer 15 stands by. When the shutter S1 is ON (YES in step S100), the camera microcomputer 15 performs the photometry and the focus detection of the object. That is, in step S101, the camera microcomputer 15 performs auto exposure (AE) and auto focus (AF) to detect the object.

After that, in step S102, the camera microcomputer 15 issues an auto bounce drive instruction to the strobe microcomputer 38. Accordingly, the strobe microcomputer 38 performs auto bounce driving as described below.

Figure 8:
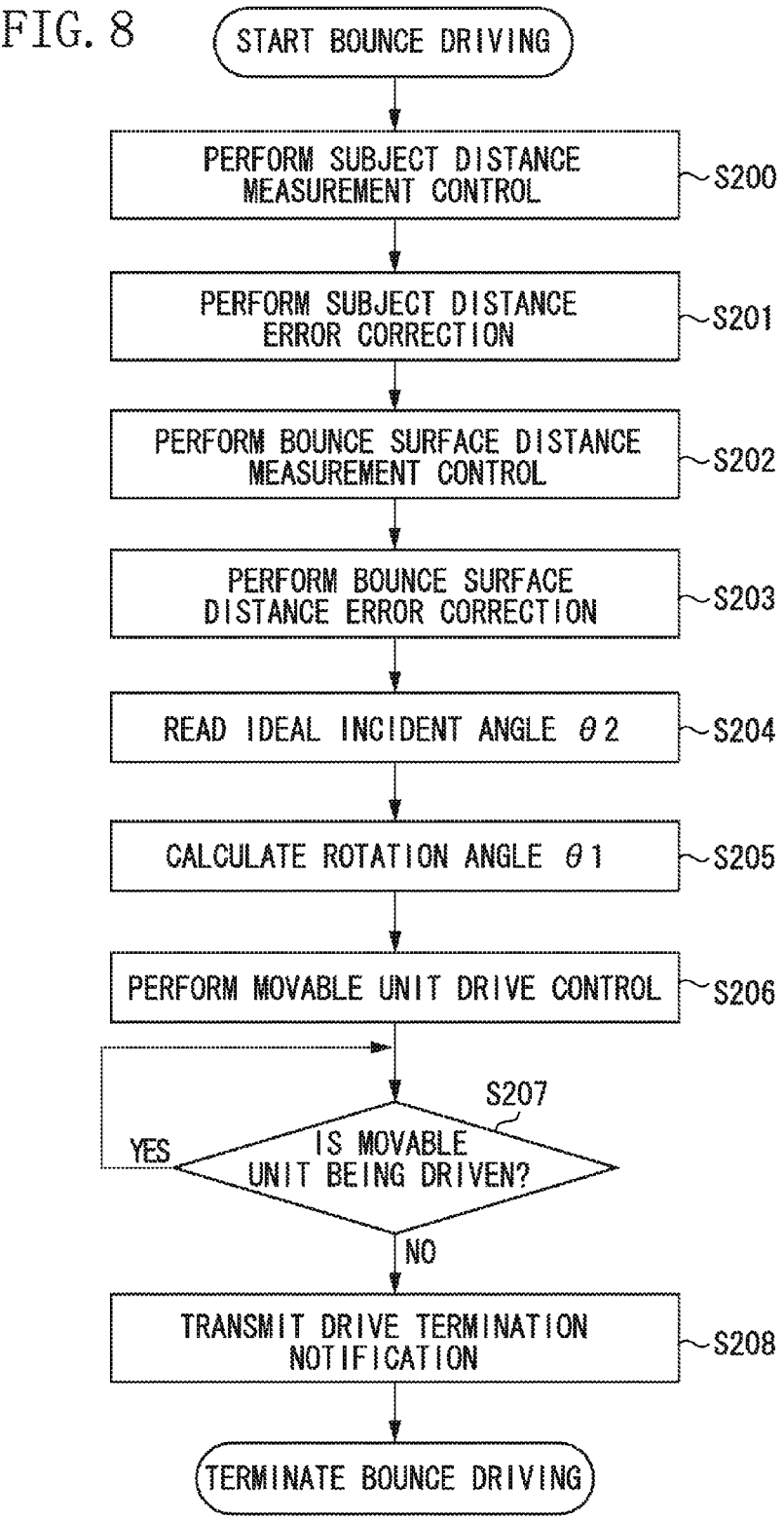
FIG. 8 is a flowchart for describing auto bounce drive processing performed in a flash device illustrated in FIG. 1.

FIG. 8 is a diagram for describing auto bounce drive control performed in the flash device 3 illustrated in FIG. 1. Processing according to the illustrated flowchart is performed under control of the strobe microcomputer 38.

When the bounce drive instruction is received from the camera microcomputer 15, in step S200, the strobe microcomputer 38 first performs object distance measurement control to obtain the object distance. In the present case, as described above, the reflected light of the light irradiated by the light emitting unit 34 toward the object is received by the ranging sensor 35, and the strobe microcomputer 38 calculates a measured object distance Xa according to a photometric value.

Next, in step S201, the strobe microcomputer 38 corrects the measurement error in the measured object distance Xa obtained in step S200. A measurement error coefficient may be stored in a memory built in the strobe microcomputer 38 in advance, and the measurement error coefficient read here at the measured object distance is Kx. A corrected object distance Xt objected to the measurement error correction is expressed by the expression below:

The corrected object distance $Xt$=the measured object distance $Xa/(1+$the measurement error coefficient $Kx)$ After that, the strobe microcomputer 38 controls the drive unit 33 such that the rotation angle of the movable unit 31 becomes 90 degrees in the up direction (the angle with respect to a horizontal plane becomes vertical). That is, the strobe microcomputer 38 sets the irradiating direction of the light emitting unit 34 to be vertical (the angle with respect to the horizontal plane becomes vertical). In step S202, the strobe microcomputer 38 then performs bounce surface distance measurement control to irradiate the bounce surface (here, a ceiling surface) with light from the light emitting unit 34 to obtain the distance to the bounce surface, and obtains a measured bounce surface distance Ya. The distance to the bounce surface is calculated by the strobe microcomputer 38 according to the photometric value that is an output of the ranging sensor 35.

Next, in step S203, the strobe microcomputer 38 corrects the measurement error of the measured bounce surface distance Ya obtained in step S202. The measurement error coefficient may be stored in the memory built in the strobe microcomputer 38 in advance, and the measurement error coefficient read here at the measured bounce surface distance is Ky. A corrected bounce surface distance Yt objected to the measurement error correction is expressed by the expression below:

The corrected bounce surface distance $Yt$=the measured bounce surface distance $Ya/(1-$the measurement error coefficient $Ky)$ Next, in step S204, the strobe microcomputer 38 reads the ideal incident angle θ2 stored in the memory built in the strobe microcomputer 38 as a table in advance. In the table stored in the memory, the object distance, the bounce surface distance, and the ideal incident angle θ2 are associated with one another, and the ideal incident angle θ2 becomes wider as the object distance is longer and the bounce surface distance is longer.

FIG. 9 illustrates an example of a table in which the corrected object distance Xt, the corrected bounce surface distance Yt, and the ideal incident angle θ2 are associated with one another. θ in FIG. 9 represents an ideal incident angle when the corrected object distance Xt=1 m and the corrected bounce surface distance Yt=1 m. However, any value can be employed as long as the table has the same tendency as the relative relationship illustrated in FIG. 9 (the longer the object distance, the wider the angle, and the longer the bounce surface distance, the wider the angle). The wide angle referred here means an incidence of the reflected light on the object from a closer position. Further, the numbers of division of the corrected object distance Xt and the corrected bounce surface distance Y are not limited to the number described in FIG. 9 either.

Next, in step S205, the strobe microcomputer 38 calculates the rotation angle θ1 of the movable unit 31, based on the corrected object distance Xt, the corrected bounce surface distance Yt, and the ideal incident angle θ2 acquired in steps S201, S203, and S204.

Figure 10:
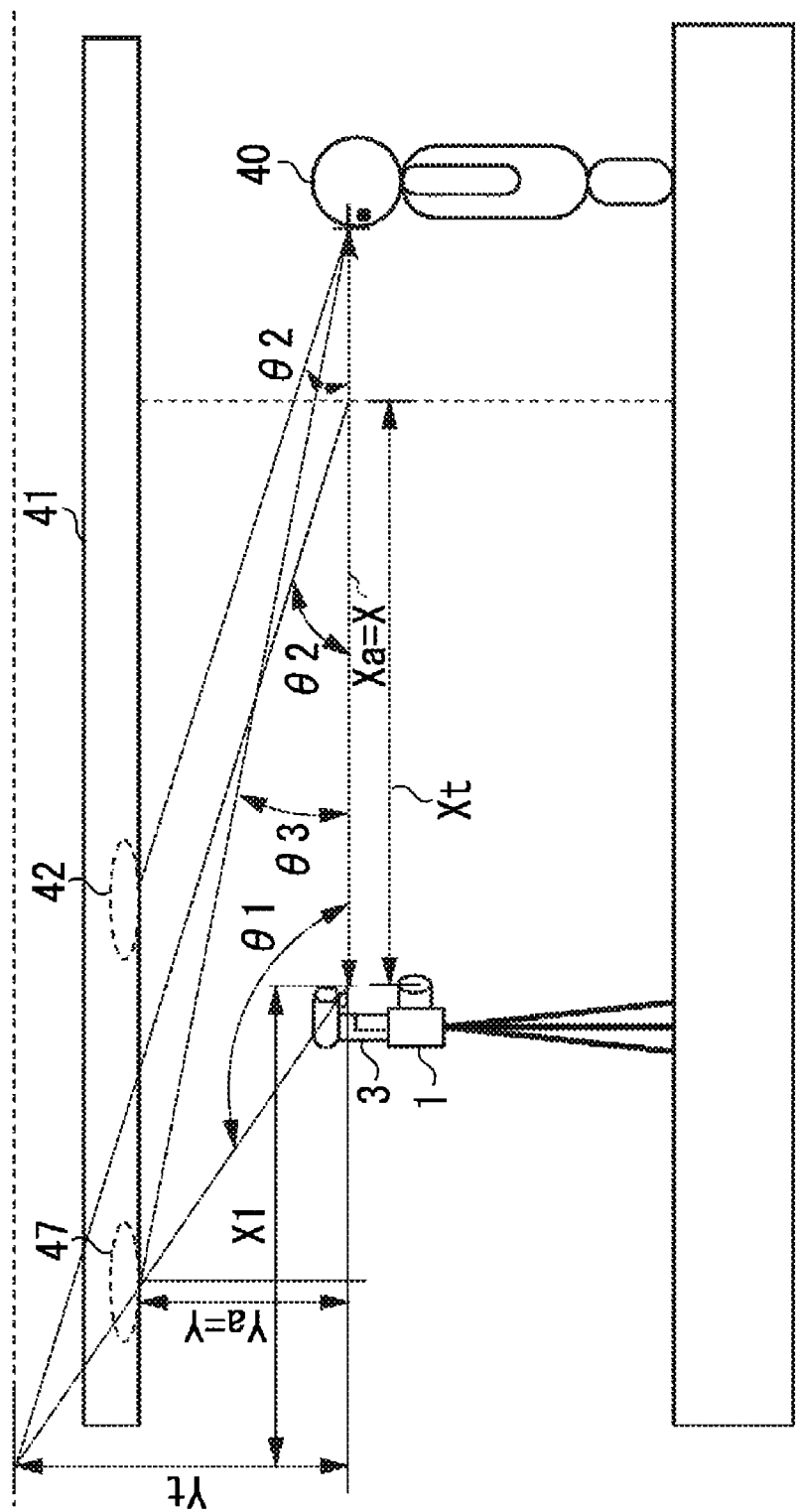
FIG. 10 is a diagram for describing a method for calculating a rotation angle, using a corrected object distance and a corrected bounce surface distance.

A method for calculating the rotation angle will be described using FIG. 10 as an example. Ya and Xa in FIG. 10 respectively represent a measured bounce surface distance and a measured object distance before correction, and FIG. 10 illustrates a case of no measurement error. Therefore, the actual object distance X=Xa and the actual bounce surface distance Y=Ya.

Further, in the calculation, X1 in FIG. 10 is a distance between the bounce surface and the flash device 3 in the horizontal direction at the corrected bounce surface distance Yt when the light is radiated in a direction of the angle θ1 from the light emitting unit 34. Further, the object 40 side is located in the + direction and the opposite side is located in the − direction, with reference to the flash device 3. From the relationship illustrated in FIG. 10, the following expressions are established:

$\tan θ2=Yt/(Xt-X1)$ $\tan θ1=180-(Yt/X1)$ and the angle θ1 can be obtained from the following expression:

θ1=180−arctan*(Yt*tan θ2/(Yt−Xt*tan θ2)

That is, the irradiating direction is calculated so that, when the bounce surface existing in the corrected bounce surface distance is irradiated with the light from the light emitting unit 34, the incident angle of the reflected light from the bounce surface with respect to the object existing in the corrected object distance becomes the predetermined angle (θ2).

Since FIG. 10 illustrates the case of no error in the measured distances, the corrected distances are shifted from the actual distances by the measurement error coefficients Kx and Ky that are assumed in advance. However, as a result, an incident angle θ3 calculated based on the corrected distances becomes narrower than the ideal incident angle θ2, and the energy loss becomes large. However, the light distribution does not become unnatural.

In step S206, the strobe microcomputer 38 then controls the drive unit 33 while referring to the angle detection result by the angle detection unit 37 to perform bounce angle driving control so that the rotation angle of the movable unit 31 is the angle θ1, according to the calculated θ1.

Next, in step S207, the strobe microcomputer 38 determines whether the movable unit 31 is being driven, and if the driving is terminated, the strobe microcomputer 38 proceeds to step S208.

Next, in step S208, the strobe microcomputer 38 transmits the bounce drive termination notification that indicates the termination of driving of the movable unit 31, to the camera microcomputer 15.

Referring back to FIG. 7, after issuing the bounce drive instruction to the strobe microcomputer 38, in step S103, the camera microcomputer 15 then determines whether the auto bounce drive control performed by the bounce drive instruction is terminated. When the auto bounce drive control is not terminated, that is, when the bounce drive termination notification has not yet been received from the strobe microcomputer 38 (NO in step S103), the camera microcomputer 15 stands by.

On the other hand, when the bounce drive termination notification has been received from the strobe microcomputer 38, then, in step S104, the camera microcomputer 15 determines whether the shutter S2 is ON.

When the shutter S2 is OFF (NO in step S104), in step S105, the camera microcomputer 15 determines whether the shutter S1 is ON. Then, when the shutter S1 is OFF (NO in step S105), the camera microcomputer 15 terminates the auto bounce photographing processing. On the other hand, when the shutter S1 is ON (YES in step S105), in step S106, the camera microcomputer 15 performs the photometry and the focus detection (AE/AF) again, and returns to the processing of step S104.

When the shutter S2 is ON (YES in step S104), the camera microcomputer 15 controls the strobe microcomputer 38 to cause the light emitting unit 34 to emit light and to carry out exposure. Then, in step S107, the camera microcomputer 15 obtains image data corresponding to an output obtained from the imaging element 11. After that, the camera microcomputer 15 terminates the auto bounce photographing processing.

As described above, in the present exemplary embodiment, a correction amount corresponding to a maximum value of the measurement error assumed in measuring the distances to determine the irradiating direction of the light emitting unit 34 is stored in advance. Then, the measured distances are corrected by the stored correction amount corresponding to the maximum value of the measurement error, and the irradiating direction is determined based on the corrected distances. At this time, as for the object distance, the measured distance is corrected to become shorter, and as for the bounce surface distance, the measured distance is corrected to become longer. The irradiating direction determined based on the corrected distances separates away from the object compared with the irradiating direction determined based on the measured distances. That is, the irradiating direction is corrected so that the light distribution does not become unnatural. Therefore, unnatural irradiation of the object with the bounce light can be reduced even if the irradiating direction is automatically determined.

In the above-described exemplary embodiment, correcting the distances measured by the lighting device to determine the irradiating direction has been described as an example. However, distances measured by the imaging device may be similarly corrected to determine the irradiating direction. At this time, the measurement error is different depending on a method for measuring the distances, and thus the measurement error coefficients corresponding to each measuring method may just be stored in advance.

Further, in the above-described exemplary embodiment, correcting both of the object distance and the bounce surface distance has been described as an example. However, only one of the distances may be corrected. When only one of the distances is corrected, unnatural irradiation of the object with the bounce light is less effectively reduced compared with a case where both of the object distance and the bounce surface distance are corrected. However, unnatural irradiation of the object can be reduced compared with the case where any of the distances is not corrected.

Further, in the above-described exemplary embodiment, an example of performing the correction by using the correction amount corresponding to the maximum value of the measurement error, has been described. However, the correction amount to be used may not be the correction amount corresponding to the maximum value. When the correction amount is not an amount corresponding to the maximum value, unnatural irradiation of the object with the bounce light can be reduced compared with the case of performing no correction, although only a less effect than the case of performing correction by using the correction amount corresponding to the maximum value can be obtained.

Further, in the above-described exemplary embodiment, correcting the object distance and the bounce surface distance has been described as an example. However, the object to be corrected may not be the distance itself. Instead, information for calculating the object distance and information for calculating the bounce surface distance may be corrected. For example, a time difference from when the light irradiated from the light emitting unit 34 is reflected at the object to when the reflected light is received by the ranging sensor 35 in the pulse propagation technique, or the drive information output from the encoder and the focus distance information of the lens unit 2 may be corrected. That is, in a case where distance information is employed as the object to be corrected, the distance information includes a value of the distance itself and information for calculating the distance.

Further, a part of the processing executed by the camera microcomputer 15 in the above-described exemplary embodiment may be executed by the strobe microcomputer 38, or a part of the processing executed by the strobe microcomputer 38 may be executed by the camera microcomputer 15. For example, the object distance and the bounce surface distance may be corrected by either the camera microcomputer 15 or the strobe microcomputer 38, and the irradiating direction may be determined based on the object distance and the bounce surface distance corrected by either the camera microcomputer 15 or the strobe microcomputer 38.

Further, the object distance and the bounce surface distance may be measured by different measuring methods, or may be measured in different measuring units even if the same measuring method is used.

Further, the present invention can be applied to a configuration in which the lighting device is built in an imaging device, instead of the configuration where the lighting device is attachable/detachable to and from the imaging device, as long as the configuration can automatically change the irradiating direction of the lighting device.

As described above, the present invention has been described based on the exemplary embodiments. However, the present invention is not limited to these exemplary embodiments, and various forms without departing from the gist of the invention are also included in the present invention.

For example, the functions of the above-described exemplary embodiments may be regarded as a control method, and the control method may be executed by an imaging device. Further, the functions of the above-described exemplary embodiments may be regarded as a control program, and the control program may be executed by a computer included in the imaging device. The control program is recorded in a computer readable recording medium.

The present invention is realized by execution of the following processing. That is, the processing is executed by supplying software (a program), which realizes the functions of the above-described exemplary embodiments, to a system or a device through a network or various recording media, and causing a computer (or a CPU or an MPU) of the system or the device to read and execute the program.

According to an exemplary embodiment of the present invention, unnatural irradiation of an object with bounce light can be reduced, even if an irradiating direction of a lighting device is automatically determined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-186875, filed Sep. 12, 2014, which is hereby incorporated by reference herein in its entirety.

What is claimed is:

1. An imaging system including a flash device capable of automatically driving a movable unit provided with a light emitting unit to change an irradiating direction of the light emitting unit, and an imaging device, the imaging system comprising:
   a first distance measuring unit configured to measure a distance of an object;
   a correcting unit configured to correct first distance information obtained by the first distance measuring unit performing measurement and generate first correction distance information; and
   a calculating unit configured to calculate the irradiating direction of the light emitting unit, based on the first correction distance information, wherein
   the correcting unit generates the first correction distance information by correcting the first distance information in a direction in which the irradiating direction calculated by the calculating unit separates away from the object.

2. The imaging system according to claim 1, wherein the correcting unit generates the first correction distance information by correcting the first distance information to make a distance indicated by the first distance information shorter.

3. The imaging system according to claim 1, further comprising
   a second distance measuring unit configured to measure a distance of an object in a direction different from the object, wherein
   the correcting unit corrects second distance information obtained by the second distance measuring unit performing measurement and generate first correction distance information, and
   the calculating unit calculates the irradiating direction based on the first correction distance information and the second correction distance information.

4. The imaging system according to claim 3, wherein the correcting unit generates the second correction distance information by correcting the second distance information in a direction in which the irradiating direction calculated by the calculating unit separates away from the object.

5. The imaging system according to claim 4, wherein the correcting unit generates the second correction distance information by correcting the second distance information to make a distance indicated by the second distance information longer.

6. The imaging system according to claim 3, wherein the calculating unit calculates the irradiating direction so that, when the object existing in a distance indicated by the second correction distance information is irradiated with light of the light emitting unit, an incident angle of reflected light from the object, on the object existing in a distance indicated by the first correction distance information becomes a predetermined angle.

7. The imaging system according to claim 6, wherein the calculating unit changes the predetermined angle according to the first distance information.

8. The imaging system according to claim 7, wherein the calculating unit changes the predetermined angle so that the reflected light from a position closer to the object is incident on the object as the distance indicated by the first distance information becomes longer.

9. The imaging system according to claim 6, wherein the calculating unit changes the predetermined angle according to the second distance information.

10. The imaging system according to claim 9, wherein the calculating unit changes the predetermined angle so that the reflected light from a position closer to the object is incident on the object as the distance indicated by the second distance information becomes longer.

11. The imaging system according to claim 1, further comprising
a storage unit configured to store a correction amount by the correcting unit, wherein
the storage unit stores the correction amount corresponding to a maximum value of a measurement error of the first distance measuring unit, as the correction amount of the first distance information.

12. The imaging system according to claim 3, further comprising
a storage unit configured to store a correction amount made by the correcting unit, wherein
the storage unit stores the correction amount corresponding to a maximum value of a measurement error of the second distance measuring unit, as the correction amount of the second distance information.

13. A lighting device comprising:
a main body unit detachably mounted on an imaging device;
a movable unit configured to be rotatable with respect to the main body unit;
a light emitting unit provided in the movable unit;
a drive unit configured to rotate the movable unit;
a first distance measuring unit configured to measure a distance of an object of the attached imaging device;
a correcting unit configured to correct first distance information obtained by the first distance measuring unit performing measurement and generate first correction distance information; and
a calculating unit configured to calculate an irradiating direction of the light emitting unit based on the first correction distance information, wherein
the correcting unit generates the first correction distance information by correcting the first distance information in a direction in which the irradiating direction calculated by the calculating unit separates away from the object.

14. A method for controlling a lighting device, the lighting device including
a main body unit detachably mounted on an imaging device,
a movable unit configured to be rotatable with respect to the main body unit,
a light emitting unit provided in the movable unit,
a drive unit configured to rotate the movable unit, and
a first distance measuring unit configured to measure a distance of an object of the attached imaging device,
the method comprising:
generating first correction distance information by correcting first distance information obtained by the first distance measuring unit performing measurement; and
calculating an irradiating direction of the light emitting unit based on the first correction distance information, wherein
the generating is generating the first correction distance information by correcting is correcting the first distance information in a direction in which the calculated irradiating direction separates away from the object.

* * * * *